US010118339B2

(12) United States Patent
Lipton et al.

(10) Patent No.: US 10,118,339 B2
(45) Date of Patent: Nov. 6, 2018

(54) DEPOSITION TOOL WITH INTERCHANGEABLE MATERIAL BAY

(75) Inventors: Jeffrey I. Lipton, Hamden, CT (US); Hod Lipson, Ithaca, NY (US); Daniel Lawrence Cohen, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 656 days.

(21) Appl. No.: 13/981,213

(22) PCT Filed: Jan. 23, 2012

(86) PCT No.: PCT/US2012/022213
§ 371 (c)(1),
(2), (4) Date: Nov. 5, 2013

(87) PCT Pub. No.: WO2012/103007
PCT Pub. Date: Aug. 2, 2012

(65) Prior Publication Data
US 2014/0050811 A1 Feb. 20, 2014

Related U.S. Application Data

(60) Provisional application No. 61/435,732, filed on Jan. 24, 2011, provisional application No. 61/435,735, filed on Jan. 24, 2011.

(51) Int. Cl.
*B29C 64/209* (2017.01)
*B33Y 30/00* (2015.01)
(Continued)

(52) U.S. Cl.
CPC ............ *B29C 64/209* (2017.08); *A23P 20/20* (2016.08); *A47J 43/04* (2013.01); *A47J 43/25* (2013.01);
(Continued)

(58) Field of Classification Search
CPC ............ B29C 67/0051; B29C 67/0055; B29C 67/0081; B29C 64/321; B29C 64/209; B29C 64/336
See application file for complete search history.

(56) References Cited

U.S. PATENT DOCUMENTS 5,121,329 A 6/1992 Crump
6,280,784 B1 8/2001 Yang et al.
(Continued)

OTHER PUBLICATIONS

Lipton, Jeffrey, et al., Fab@Home Model 2: Towards Ubiquitous Personal Fabrication Devices, 2009 International Solid Freeform Fabrication Symposium (2009), pp. 70-81.*
(Continued)

*Primary Examiner* — Matthew J Daniels
(74) *Attorney, Agent, or Firm* — Burns & Levinson LLP; Orlando Lopez

(57) ABSTRACT

Technologies are provided herein for a modular deposition tool design that allows for both, the fast interchanging of materials and for easy cleaning of all wetted surfaces. A drive assembly for use in a solid freeform fabrication system, includes a drive module having a drive mechanism and a detachable material bay assembly that is detachable from the drive module. The material bay assembly includes a material bay holder, a material deposition tool, and a corresponding material bay actuation mechanism that can engage with the drive mechanism of the drive module when the material bay assembly is coupled to the drive module such that when the drive mechanism of the drive module is actuated, the material bay actuation mechanism is actuated, which causes the material deposition tool to deposit material from a material bay inserted in the material bay holder.

8 Claims, 8 Drawing Sheets

(51) Int. Cl.

| | | |
|---|---|---|
| *B29C 44/16* | (2006.01) | |
| *A47J 43/25* | (2006.01) | |
| *B29C 67/00* | (2017.01) | |
| *A47J 43/04* | (2006.01) | |
| *B29C 37/00* | (2006.01) | |
| *A23P 20/20* | (2016.01) | |
| *A23P 20/25* | (2016.01) | |

(52) U.S. Cl.
CPC .......... *B29C 37/0025* (2013.01); *B29C 44/16* (2013.01); *B29C 67/0055* (2013.01); *B33Y 30/00* (2014.12); *A23P 2020/253* (2016.08)

(56) References Cited

U.S. PATENT DOCUMENTS

| | | | |
|---|---|---|---|
| 6,280,785 B1 | 8/2001 | Yang et al. | |
| 6,372,178 B1 | 4/2002 | Tseng | |
| 7,625,198 B2 | 12/2009 | Lipson et al. | |
| 7,725,209 B2 | 5/2010 | Menchik et al. | |
| 2001/0005489 A1* | 6/2001 | Roach | G01N 27/44704 422/509 |
| 2004/0018119 A1* | 1/2004 | Massaro | B01L 3/022 422/509 |
| 2006/0156978 A1 | 7/2006 | Lipson et al. | |
| 2006/0160250 A1* | 7/2006 | Bonassar | B29C 67/0055 438/1 |

OTHER PUBLICATIONS

International Preliminary Report on Patentability dated Jul. 30, 2013 for PCT/US12/22213.
International Search Report dated Aug. 31, 2012 for PCT/US12/22213.
Lipton, J.I., et al., (2010) "Multi-Material Food Printing with Complex Internal Structure Suitable for Conventional Post-Processing", 21st Solid Freeform Fabrication Symposium (SFF'10), Austin TX, USA.
Cohen, D.L., et al., (2009) "Hydrocolloid Printing: A Novel Platform for Customized Food Production" Solid Freeform Fabrication Symposium (SFF'09), Aug 3-5, 2009, Austin, TX, USA.
"The Cornucopia: MIT's 3D food printer patiently awaits 'the future'," available at http://www.engadget.com/2010/01/21/the-cornucopia-mits-3d-food-printer-patiently-awaits-the-futu/, posted Jan. 21, 2010.
Cornucopia: Prototypes and Concept Designs for a Digital Gastronomy. © 2003-2011 Marcelo Coelho. Available at: http://web.media.mit.edu/~marcelo/cornucopia/.

* cited by examiner

DEPOSITION TOOL WITH INTERCHANGEABLE MATERIAL BAY

CROSS-REFERENCE TO RELATED APPLICATIONS

This application is a U.S. national stage application under 35 U.S.C. 371 of co-pending International Application No. PCT/US12/22213 filed on Jan. 23, 2012 and entitled DEPOSITION TOOL WITH INTERCHANGEABLE MATERIAL BAY, which in turn claims priority to U.S. Provisional Patent Application No. 61/435,732 filed on Jan. 24, 2011, and to U.S. Provisional Patent Application No. 61/435,735 filed on Jan. 24, 2011, both of which are incorporated by reference herein in their entirety for all purposes.

BACKGROUND

Solid freeform fabrication (SFF), i.e. 3D printing, is becoming increasingly popular and is projected to enter new markets, such as tissue engineering, food printing, and consumer home use. One factor, but not limited thereto, limiting the feasibility of implementing SFF systems in emerging markets is the need for keeping the machine clean and sterile. Accordingly, there is a need for a tool design that addresses the problems described above.

BRIEF SUMMARY

Technologies are provided herein for a modular deposition tool design that allows for both, the fast interchanging of materials and for easy cleaning of all wetted surfaces. This design is founded on the idea of implemented a decoupled drive train, in which a materials bay assembly can be easily separated from the drive module.

In one aspect, a drive assembly for use in a solid freeform fabrication system, includes a drive module having a drive mechanism and a detachable material bay assembly that is detachable from the drive module. The material bay assembly includes a material bay holder, a material deposition tool, and a corresponding material bay actuation mechanism that can engage with the drive mechanism of the drive module. The material bay assembly is coupled to the drive module such that the material bay actuation mechanism is actuated when the drive mechanism of the drive module is actuated, which causes the material deposition tool to deposit material from a material bay inserted in the material bay holder.

In another aspect, a solid freeform fabrication system, includes a drive module having a drive mechanism, and a detachable material bay assembly that is detachable from the drive module. The material bay assembly includes a material bay holder, a material deposition tool, and a material bay actuation mechanism mounted on the material bay assembly.

In yet another aspect, a material bay assembly includes at least one material bay holder for holding a material bay containing material to be deposited, and at least one material deposition tool configured to deposit the material contained in the material bay. The material bay assembly also includes a material bay housing that has a coupling interface configured to engage with an attachment interface of a drive module of a solid freeform fabrication system. The material bay assembly further includes at least one material bay actuation mechanism configured to be actuated by a component of the solid freeform fabrication system, which causes the material deposition tool to deposit material from a material bay inserted in the material bay holder.

DETAILED DESCRIPTION

Technologies are provided herein for a modular deposition tool design that allows for both, the fast interchanging of materials and for easy cleaning of all wetted surfaces. This design is founded on the idea of implementing a decoupled drive train, in which a materials bay can be easily separated from the drive module. This deposition tool decouples the drive module from the wetted surfaces, and interfaces these two functional components with a quick-change mechanism. Not only can the materials bay be quickly swapped, but all wetted surfaces could be directly machine washed. As a result, structures that require more material than an amount that can be contained in a single cartridge can be fabricated since an operator can now swap material cartridges in a shorter amount of time than previously existing systems. By way of the present disclosure, an operator of the deposition system may utilize embodiments of the present disclosure for fabricating a wide variety of different structures for a wide range of industries, including those that rely on fabrication processes that require a clean and sanitary environment.

In particular, various structures for use in the home or medical markets may be fabricated using embodiments described herein. These enormous markets are on the brink of being tapped into, however, practical considerations have so far, limited their feasibility as there is no easy way to clean or sterilize the deposition tools, nor any mechanism for quickly changing materials. Also, the present disclosure may be utilized on other commercial SFF systems as the teachings herein solve the challenge of efficiently cleaning wetted components and changing materials for multiple material printers.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

Co-pending PCT patent application entitled "DEPOSITION OF MATERIALS FOR EDIBLE SOLID FREEFORM FABRICATION" (PCT Publication No. WO 2012/103005) and co-pending U.S. Utility patent application entitled "SYSTEMS AND METHODS FOR FREEFORM FABRICATION OF FOAMED STRUCTURES" (US Publication No. 2012-024193), both filed on Jan. 23, 2012, having first named inventor Jeffrey Lipton, are hereby incorporated by reference in their entirety and for all purposes. In addition, issued U.S. Pat. No. 7,625,198 entitled "MODULAR FABRICATION SYSTEMS AND METHODS" is also hereby incorporated by reference in its entirety and for all purposes.

Figure 1:
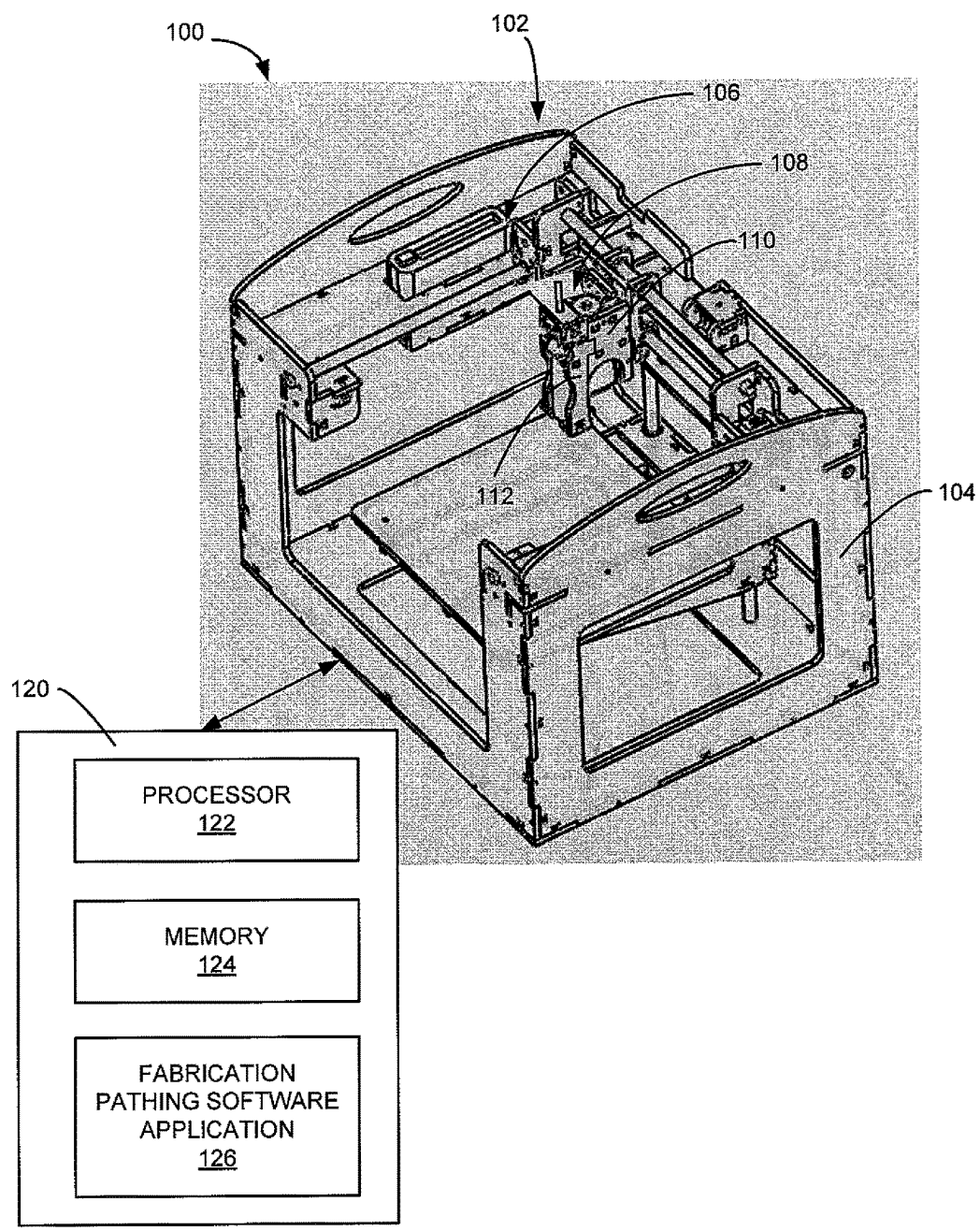
FIG. 1 is a pictorial schematic representation of a three dimensional fabricator according to embodiments of the present disclosure.
Figure 2:
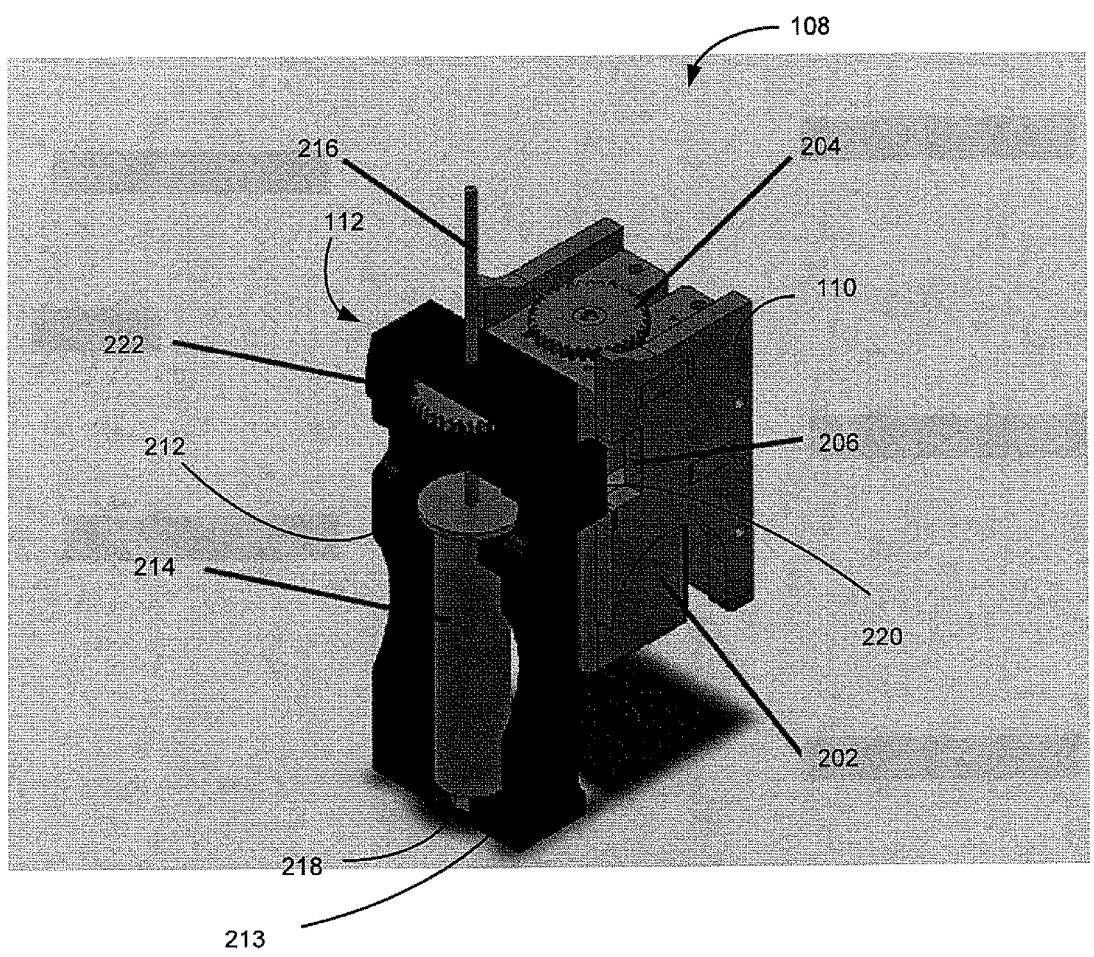
FIG. 2 is a pictorial representation of an interchangeable material bay assembly and a drive module of the three dimensional fabricator of FIG. 1 according to embodiments of the present disclosure.
Figure 3:
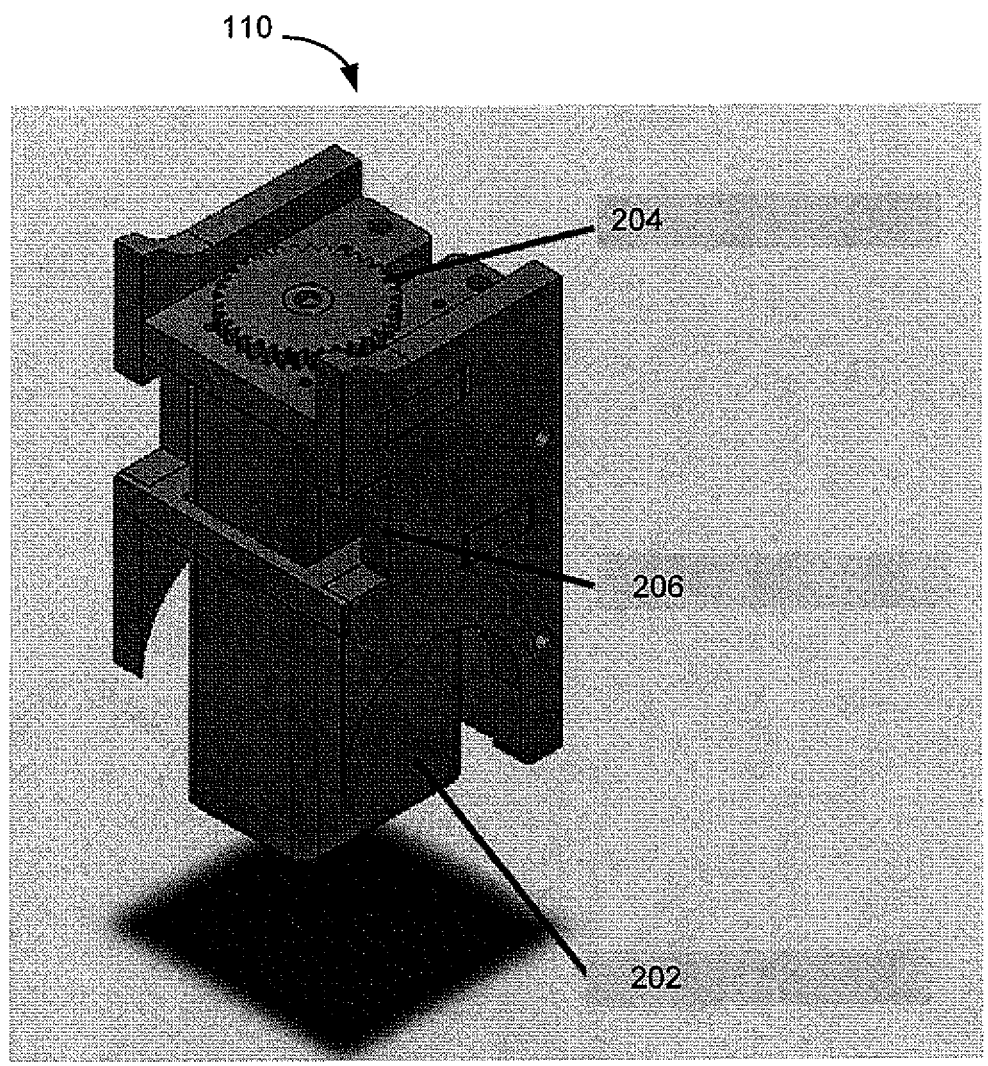
FIG. 3 is a pictorial representation of the drive module of FIG. 2 according to embodiments of the present disclosure.

Referring now to the figures, FIG. 1 is a pictorial representation of a three dimensional fabrication system according to embodiments of the present disclosure. The three dimensional fabrication system 100 comprises a fabricator 102 having a housing 104, a control unit 106, and a drive assembly 108 having a drive module 110 coupled to an interchangeable material bay assembly 112, as shown in additional details with respect to FIGS. 2-5. The control unit 106 may be configured to receive instructions from a processing unit 120. The processing unit constitutes, but is not limited to, a processor 122, a memory 124, and a fabrication pathing software application 126, which is executable by the processor 122. The fabrication pathing software application 126 is configured to map out the path of the drive assembly 108. In particular, the fabrication pathing software application may be configured to provide instructions to the control unit 106 which cause the control unit 106 to control the speed and direction of the drive assembly 108 as well as the speed and volume at which material is dispensed from the interchangeable material bay assembly 112. In various embodiments, the control unit 106 may be configured to communicate with the drive assembly 108 using sensors, actuators, and other electrical components.

FIGS. 2-5 illustrate various views of the interchangeable material bay assembly 112 and corresponding drive module 110 of the three dimensional fabricator 102 of FIG. 1 according to embodiments of the present disclosure. As described above, the drive assembly 108 includes at least one or more drive modules 110 and one or more material bay assemblies 112. The drive module 110 includes at least one actuation module 202 configured to control a corresponding matching drive mechanism 204 that is configured to actuate the material deposition mechanism of the corresponding material bay assembly 112. Additionally, the drive module 110 also includes at least one interface 206 for connecting the drive module 110 to the detachable material bay assembly 112.

The material bay assembly 112 includes a material bay frame or housing 213 having corresponding interfaces 220 configured to engage with the interface 206 of the drive module 110. In various embodiments, the interfaces 206 and 220 may be coupled together to attach and lock the material bay assembly 112 to the drive module 110. The material bay assembly 112 may also include at least one material bay holder 212 configured to receive a material bay 214, including but not limited to syringes, wells, bags, capsules, boxes, tubes, capillaries, bottles, cartons, and cups.

The material bay assembly 112 may also include a material deposition tool comprising a material deposition outlet 218 and a material deposition module. The material deposition module includes a material bay actuation mechanism 222 and a plunger 216, for example, which may be in the form of any type of conventional actuator. In various embodiments, the material deposition tool may include at least one of a dual-syringe tool, a rotary cutting tool, a plastic deposition tool, a material pressure driven tool, a spring force driven cutting tool, and a pipetting tool. It should be appreciated by those skilled in the art that the fabrication systems disclosed herein can also be utilized for plastic filament systems.

Figure 4:
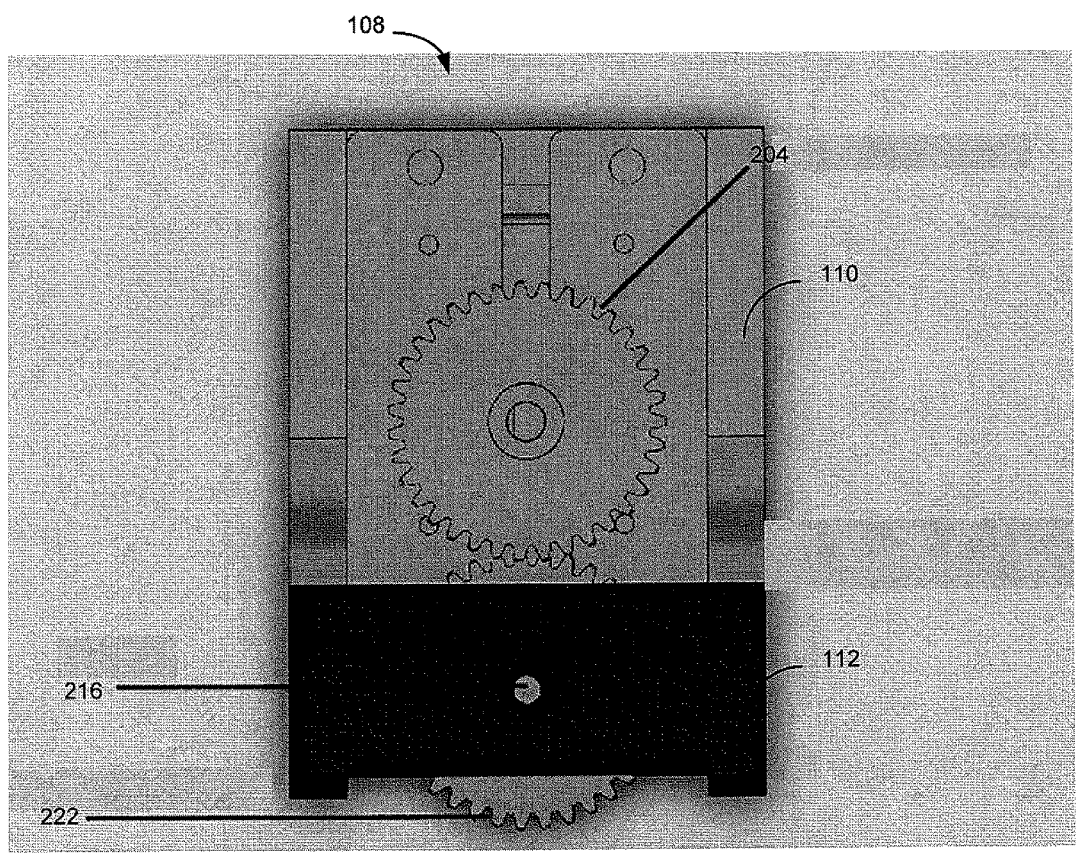
FIG. 4 is a top view of the interchangeable material bay assembly coupled to the drive module of FIG. 2 according to embodiments of the present disclosure.
Figure 5:
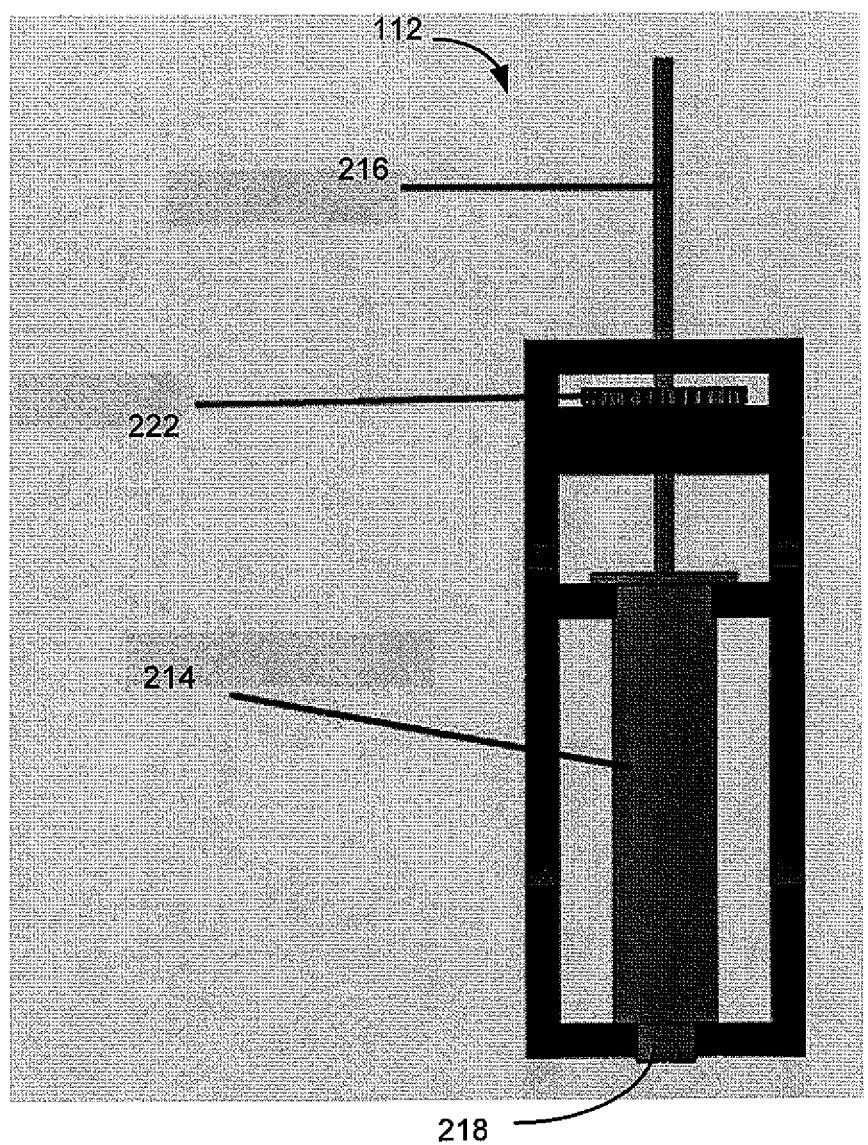
FIG. 5 is a front view of the interchangeable material bay of FIG. 2 according to embodiments of the present disclosure.

As shown in further detail with respect to FIG. 4, the material bay actuation mechanism 222 is configured to engage with the drive mechanism 204 of the drive module 110 such that when the drive mechanism 204 is actuated, the material deposition mechanism of the material bay assembly 112 is also actuated, thereby causing the material bay assembly 112 to dispense material from the material bay 214 via the material deposition outlet 218. This actuation mechanism is not limited to the mechanisms shown but may also be in the form of wheels, gears, pulleys, magnets, coils, or any other electrical, magnetic, or mechanical mechanism. Non-contact mechanisms, such as those involving transmission via magnetic forces or through coil inductance, are also envisioned. In various embodiments, the material deposition mechanism is actuated when the material bay actuation mechanism 222 rotates, causing the plunger 216 to exert a force on the material bay 214, causing material to exit the material deposition outlet 218. In various embodiments, the material deposition mechanism should be configured such that when the material bay assembly 112 is engaged with the drive module 110, the material deposition mechanism of the material bay assembly 112 is also engaged with the drive mechanism 204 of the drive module 110.

The drive assembly 108 may be manufactured using standard fabrication techniques. The frame of the drive assembly can be made in any number of ways including but not limited to, milling, CNC'ing, additive manufacturing, laser cutting, and injection molding. The material used for fabricating one or more components of the drive assembly 108 can be any sufficiently strong material including, but not limited to, metal, plastic, wood, ceramic, or any combination thereof. The device and parts may be made of one or more materials including machine-washable and autoclavable materials.

The drive mechanism 204 may be powered by a servo, stepper, DC motor, linear actuators, pneumatics hydraulics, solenoids, piezos, or any other component capable of actuating the drive mechanism. In various embodiments, the drive mechanism 204 and the complementary material bay actuation mechanism 222 may be coupled using a drive train, which in some embodiments, may be a chain of spur and/or worm gears, pulleys, belts, and the like. In embodiments that utilize a drive train, the drive assembly 108 may require that the drive train be engaged with the drive mechanism 204 and the complementary material bay actuation mechanism 222 each time a material bay assembly 112 is reattached to the drive module 110. In one embodiment, the drive assembly 206 may be fabricated using injection molding and the drive train constitutes a spur shaped gear-based drive train, with DC motors operating as the drive mechanism. In some embodiments, sensors may be used to provide position feedback to the system for controlling the drive mechanism.

The drive assembly 108 may use any of the following alignment-mechanisms, or combinations thereof, to prescribe one or more degrees of freedom between the components of the drive assembly 108, including but not limited to, magnets, pins, latches, grooves, channels with or without locking mechanisms, or matching geometries.

The drive assembly 108 may, use the any of the following binding mechanisms, or combinations thereof, to lock the position and orientation of the modules, including but not limited to, latches, magnets, quick release pins, standard pins, screws, rubber bands, bolts, interference fittings. The drive assembly 108 may use a single mechanism that serves as both a binding and alignment mechanism.

The drive assembly 108 may use one or more of the following drive mechanisms with or without position feedback from limit switches. The drive assembly 108 may further include sensors on at least one of the drive module 110 and the material bay assembly 112. In various embodiments, the material bay assembly 112 may be automatically aligned and/or bound with the drive module 110. In other embodiments, the material bay assembly 112 may be manually aligned and/or bound with the drive module 110.

The drive assembly 108 may use one or more of, but not limited to, the following interfaces with SFF systems: locks, screws; latches, magnets, quick release pins, standard pins; screws, rubber bands, bolts, interference fittings, latches, grooves, channels with or without locking mechanisms, and/or matching geometries.

The material bay assembly 112 may be implemented as any of, but not limited to, the following functions: a pressure pen deposition tool, a syringe extruder deposition tool, a plastic extruder deposition tool, a drop-on-demand deposition tool, an inkjet deposition tool, a photo-reactive-based deposition tool, or a pipetting or other lab automation device end effector.

Figure 6:
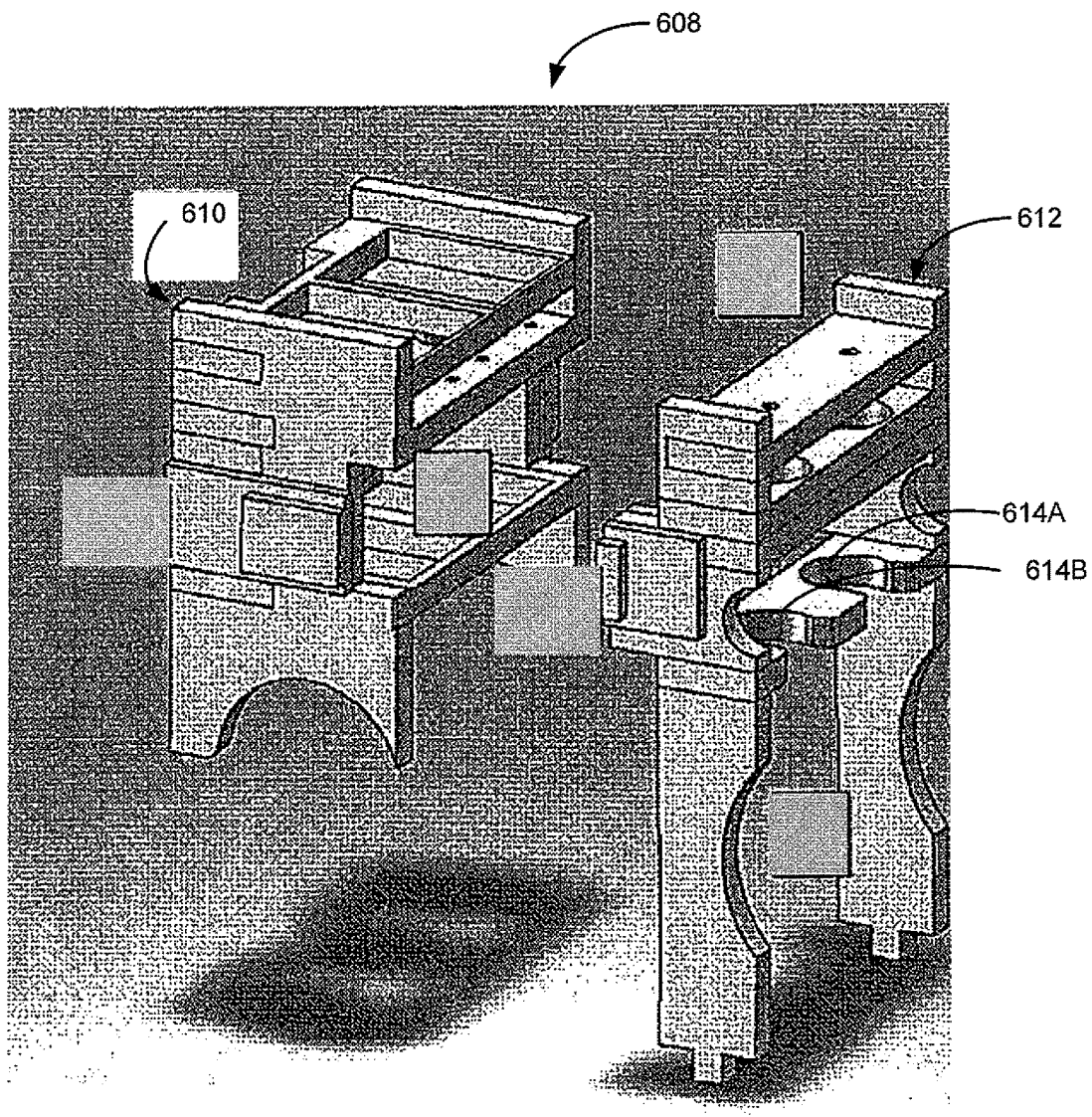
FIG. 6 is a pictorial representation of an interchangeable material bay assembly having multiple material bays and corresponding drive modules of a three dimensional fabricator according to embodiments of the present disclosure.

Referring now to FIG. 6, a pictorial representation of an interchangeable material bay assembly having multiple material bays and corresponding drive modules of a three dimensional fabricator is shown. In this embodiment, a drive assembly 608 includes a drive module 610 and an interchangeable material bay assembly 612 that has multiple material bay holders 614A-B, each of which is configured to receive a material bay. In various embodiments, the material bay assembly 612 may also include a corresponding number of material deposition tools that may be different. In this way, materials contained in different material bays may be deposited via different material deposition tools. In addition, by having multiple material bays on board the material bay assembly 612, more material can be deposited before the drive assembly runs out of material as compared to embodiments with a single material bay, as shown in FIGS. 2-5.

Figure 7:
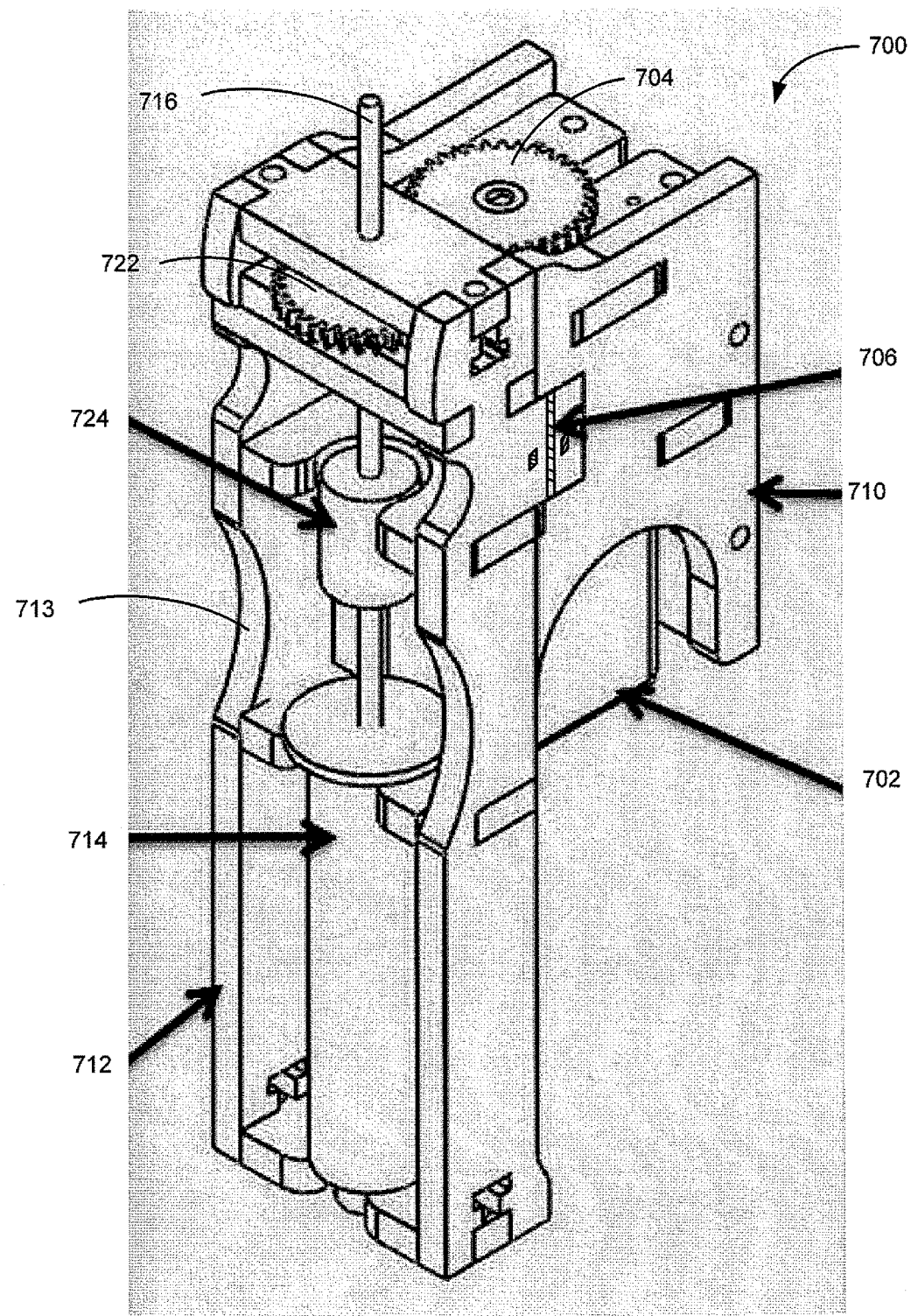
FIG. 7 is a pictorial representation of an interchangeable material bay assembly and a drive module according to embodiments of the present disclosure.
Figure 8:
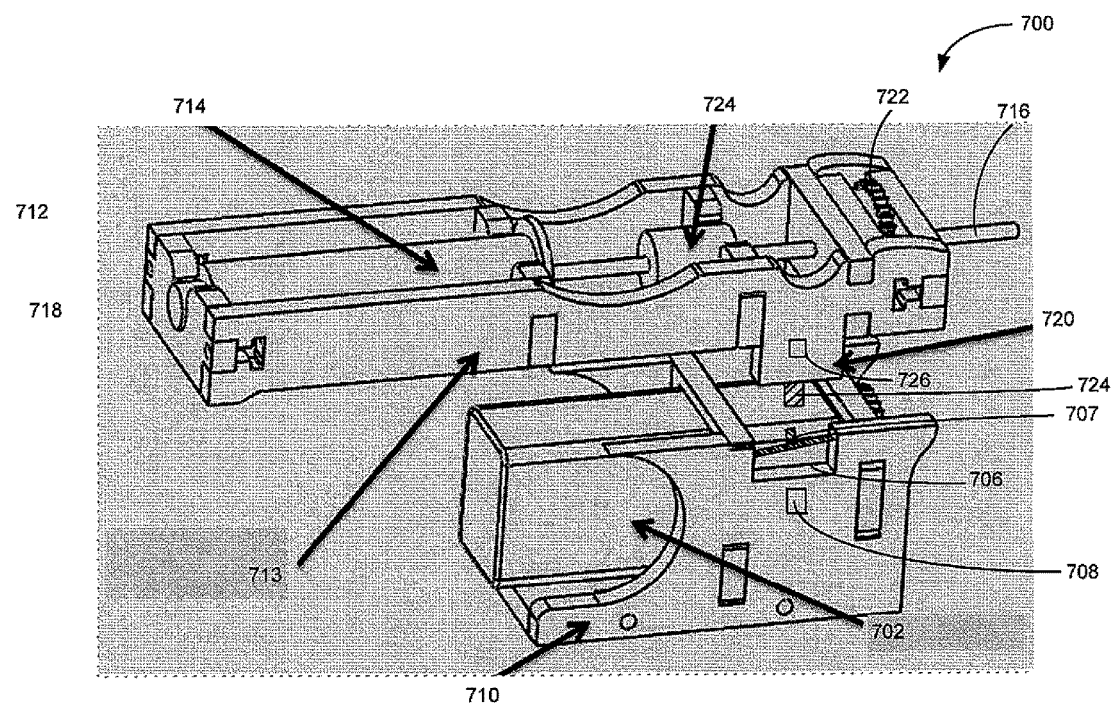
FIG. 8 is a pictorial representation of an interchangeable material bay assembly and a drive module shown in FIG. 7 according to embodiments of the present disclosure.

FIGS. 7 and 8 are pictorial representations of a drive assembly 700 including an interchangeable material bay assembly 712 and a drive module 710 according to embodiments of the present disclosure. The reference numerals shown in FIGS. 7 and 8 correspond to similar reference numerals shown in FIGS. 2-5. Syringe 714 is coupled to a coupler 724 that couples the drive mechanism of the material bay assembly 712 to the drive mechanism of the drive module 710. Referring now to FIG. 8, an embodiment of a locking mechanism is shown. The drive module may include a notch 707 for engagement with a corresponding aperture 726 in the material bay assembly 712, while the material bay assembly 712 may include a notch 724 for engagement with a corresponding aperture 708 in the drive module 710. The notches 707, 724 and the apertures 708, 726 may be sized and configured such that when the material bay assembly 712 is coupled to the drive module 710, the notches and apertures mate to securely lock the material bay assembly and the drive module 710 together. By securely fastening the material bay assembly 712 to the drive module 710, the risk of any moving parts during operation is completely or almost eliminated, resulting in the system accurately printing the fabricated structure.

It should be appreciated that by being able to separate the material bay assembly 712 from the drive module 710, the system can maintain a sterile environment for biomaterials by using disposable material bays or reservoirs in the form of pre-sealed and sterilized syringes. Furthermore, a user of the system can quickly switch out the material bay assembly 712 without having to disassemble or handle expensive motors and electronics contained in the drive module 710. In addition, a user can now fabricate a larger variety of structures by utilizing a wide variety of material bay assemblies that are inexpensive to manufacture since the material bay assemblies are detachable from the drive module that contains the expensive electronics. In addition, the material bay assemblies can now be manufactured with more versatility, including material bay assemblies that utilize various types of material bays, deposition outlets, or dispensing mechanisms. For instance, syringes with different bore diameters may be used with different nozzle outlet diameters and shapes, allowing for a much wider range of deposition layer designs. It should also be appreciated that the system may be quickly and easily repaired by replacing a problematic material bay assembly. Since the material bay assembly also includes a drive mechanism, material bay assemblies may be designed with any one of a wide variety of drive mechanisms allowing for more flexibility in the speed at which material is deposited by adjusting the speed at which the plunger or other dispensing mechanism is actuated. It should also be appreciated that the material bay assembly can now be manufactured without or with fewer electric components, and therefore the material bay assembly may be more safe for washing in a dishwasher or sterilizing in an autoclave.

While the foregoing includes the best mode and, where appropriate, other modes of performing the disclosure, the disclosure should not be limited to specific apparatus configurations or method steps disclosed in this description of the preferred embodiment. Those skilled in the art will also recognize that the disclosure has a broad range of applications, and that the embodiments admit of a wide range of modifications without departing from the inventive concepts.

What is claimed is:

1. A drive assembly for use in a solid freeform fabrication system, comprising:
   a drive module comprising a drive mechanism having a first spur shaped drive gear; and
   a detachable material bay assembly detachable from the drive module, the material bay assembly comprising a material bay holder, a material deposition tool, and a corresponding material bay actuation mechanism having a second spur shaped drive gear complementary to and configured to engage with the first spur shaped drive gear of the drive module when the material bay assembly is coupled to the drive module such that when the drive mechanism of the drive module is actuated, the second spur shaped drive gear is actuated causing the material deposition tool to deposit material from a material bay inserted in the material bay holder;
   wherein the material bay assembly comprises a material bay frame having at least one coupling interface for attachment to the drive module;

further wherein the drive module comprises a drive module frame having at least one attachment interface configured to engage with the at least one coupling interface of the material bay frame to mutually engage the material bay frame and the drive module frame and to mutually engage the first and second spur shaped drive gears;

still further wherein the at least one coupling interface includes a first notch and a first aperture and the at least one attachment interface includes a second notch adapted for engaging the first aperture, and a second aperture adapted for engaging the first notch.

2. The drive assembly of claim 1, wherein the material deposition tool comprises at least one of a dual-syringe tool, a rotary cutting tool, a plastic deposition tool, a material pressure driven tool, a spring force driven cutting tool, a pipetting tool.

3. The drive assembly of claim 1 wherein the material bay actuation mechanism further comprises a plunger operable by the second spur shaped drive gear, the plunger configured to cause the material deposition tool to deposit material from the material bay.

4. The drive assembly of claim 1, wherein the drive assembly is coupled with the solid freeform fabrication system.

5. A solid freeform fabrication system, comprising:
a drive module comprising a drive mechanism having a first spur shaped drive gear; and
a detachable material bay assembly detachable from the drive module, the material bay assembly comprising a material bay holder, a material deposition tool, and a material bay actuation mechanism mounted thereon, said material bay actuation mechanism having a second spur shaped drive gear;
wherein the second spur shaped drive gear is configured to engage with the first spur shaped drive gear of the drive module when the material bay assembly is coupled to the drive module such that when the drive mechanism of the drive module is actuated, the second spur shaped drive gear is actuated causing the material deposition tool to deposit material from a material bay inserted in the material bay holder;
further wherein the material bay assembly comprises a material bay frame having at least one coupling interface for attachment to the drive module;
still further wherein the drive module comprises a drive module frame having at least one attachment interface configured to engage with the at least one coupling interface of the material bay frame to mutually engage the material bay frame and the drive module frame and to mutually engage the first and second spur shaped drive gears;
even further wherein the at least one coupling interface includes a first notch and a first aperture and the at least one attachment interface includes a second notch adapted for engaging the first aperture, and a second aperture adapted for engaging the first notch.

6. A material bay assembly, comprising:
at least one material bay holder for holding a material bay containing material to be deposited;
at least one material deposition tool configured to deposit the material contained in the material bay;
a material bay housing comprising a coupling interface configured to engage with an attachment interface of a drive module of a solid freeform fabrication system; and
at least one material bay actuation mechanism comprising a first spur shaped drive gear configured to be actuated by a second spur shaped drive gear of the drive module, when the coupling interface of the material bay housing engages an attachment interface of a drive module, for causing the material deposition tool to deposit material from a material bay inserted in the material bay holder when the material bay assembly is coupled to the drive module of a solid freeform fabrication system;
wherein the coupling interface includes a first notch and a first aperture adapted for respectively engaging a second aperture and a second notch on the attachment interface of the drive module.

7. The material bay assembly of claim 6 being fabricated from a material that can be autoclaved.

8. The material bay assembly of claim 6, wherein the material bay actuation mechanism further comprises a plunger that is operable by the first spur shaped drive gear.

* * * * *